United States Patent
Fujinawa et al.

(10) Patent No.: US 6,622,093 B1
(45) Date of Patent: Sep. 16, 2003

(54) METHOD AND SYSTEM FOR PREDICTING RAPID MOTION IN EARTH'S CRUST ON BASIS OF ELECTROMAGNETIC FIELD OBSERVATION

(75) Inventors: Yukio Fujinawa, Tsukuba (JP); Hiroshi Iitaka, Tsukuba (JP); Kozo Takahashi, Koganei (JP)

(73) Assignees: Science and Technology Agency National Research Institute for Earth Science and Disaster Prevention, Tsukuba (JP); Agency of Industrial Science and Technology, Tokyo (JP); Ministry of Posts and Telecommunications Communications Research Laboratory, Koganei (JP)

( * ) Notice: Subject to any disclaimer, the term of this patent is extended or adjusted under 35 U.S.C. 154(b) by 77 days.

(21) Appl. No.: 09/671,312

(22) Filed: Sep. 28, 2000

(30) Foreign Application Priority Data

Sep. 28, 1999  (JP) ............................................ 11-273498

(51) Int. Cl.⁷ ................................................ G01V 1/00
(52) U.S. Cl. ......................................... 702/15; 324/344
(58) Field of Search ................ 702/2, 14, 15; 324/344, 348; 367/38

(56) References Cited

U.S. PATENT DOCUMENTS

| | | | | | |
|---|---|---|---|---|---|
| 4,837,582 A | * | 6/1989 | Takahashi et al. | .......... | 343/719 |
| 5,387,869 A | * | 2/1995 | Enomoto | ..................... | 324/348 |
| 5,737,219 A | * | 4/1998 | Vartanyan | ..................... | 367/38 |
| 5,783,945 A | * | 7/1998 | Balbachan | .................. | 324/348 |
| 6,462,549 B1 | * | 10/2002 | Curtis et al. | ................. | 324/323 |

* cited by examiner

Primary Examiner—Marc S. Hoff
Assistant Examiner—Anthony Gutierrez
(74) Attorney, Agent, or Firm—Armstrong, Westerman & Hattori, LLP

(57) ABSTRACT

A casing pipe is inserted into a drilled hole reaching the inside of a confined aquifer in which groundwater is stored and flows or a position near the confined aquifer. A measuring device measures an electromagnetic field at the distal end of the casing pipe. An analyzing device analyzes data concerning the electromagnetic field measured by the measuring device to sense motion of ground pore water, thereby predicting rapid motion in the earth's crust, such as a volcanic eruption, an earthquake, a landslide and ground collapse. The casing pipe is an electrically conductive pipe having a non-magnetic screen portion formed at the distal end thereof so that recycling groundwater passes through the screen portion. The measuring device includes an electromagnetic field sensor placed in the screen portion and the conductive casing pipe as an electrode for measuring an electric potential relative to an electric potential at the earth's surface detected with a reference electrode.

4 Claims, 2 Drawing Sheets

METHOD AND SYSTEM FOR PREDICTING RAPID MOTION IN EARTH'S CRUST ON BASIS OF ELECTROMAGNETIC FIELD OBSERVATION

BACKGROUND OF THE INVENTION

The present invention relates to a prediction method and system capable of predicting rapid motion in the earth's crust, such as a volcanic eruption, an earthquake, a landslide and ground collapse, by sensing a precursory phenomenon on the basis of an electromagnetic field observation.

For the prediction of volcanic eruptions, earthquakes, landslides, ground collapse, etc., it is most important to capture precursory phenomena. In studies and research conducted so far, promising precursory phenomena relating to diastrophism and seismic activities have been reported, and methods and systems for measuring such precursory phenomena have been proposed. However, a decisive precursory phenomenon has not yet been found, and there has been proposed no effective system for measuring such a precursory phenomenon. Meanwhile, it has recently become clear that underground fluids, e.g. groundwater and magma, fundamentally play an important role in causing such phenomena in the earth's crust. However, no attempts have been made to capture precursory phenomena by positively utilizing the knowledge of this fact and to make use of the precursory phenomena to minimize disasters that accompany earthquakes, volcanic eruptions, ground collapse, etc.

SUMMARY OF THE INVENTION

In view of the above-described problems, an object of the present invention is to make it possible to predict rapid motion in the earth's crust by sensing a precursory phenomenon with a simple method and system.

To attain the above-described object, the present invention provides a prediction method of predicting rapid motion in the earth's crust, such as a volcanic eruption, an earthquake, a landslide and ground collapse, wherein an electromagnetic field is measured in or near a confined aquifer in which groundwater is stored and flows, and motion of ground pore water is sensed on the basis of the measured electromagnetic field to predict rapid motion in the earth's crust. Preferably, the measurement of the electromagnetic field is performed at the distal end of a casing pipe inserted into a drilled hole.

In addition, the present invention provides a prediction system for predicting rapid motion in the earth's crust, such as a volcanic eruption, an earthquake, a landslide and ground collapse. The system includes a casing pipe inserted into a drilled hole reaching the inside of a confined aquifer in which groundwater is stored and flows or a position near the confined aquifer. A measuring device measures an electromagnetic field at the distal end of the casing pipe. An analyzing device analyzes data concerning the electromagnetic field measured by the measuring device to sense motion of ground pore water, thereby predicting rapid motion in the earth's crust. Preferably, the casing pipe is an electrically conductive pipe having a non-magnetic screen portion formed at the distal end thereof so that recycling groundwater passes through the screen portion, and the measuring device includes an electromagnetic field sensor placed in the screen portion. The measuring device may include the conductive casing pipe as an electrode for measuring an electric potential relative to an electric potential at the earth's surface detected with a reference electrode.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

Figure 1:
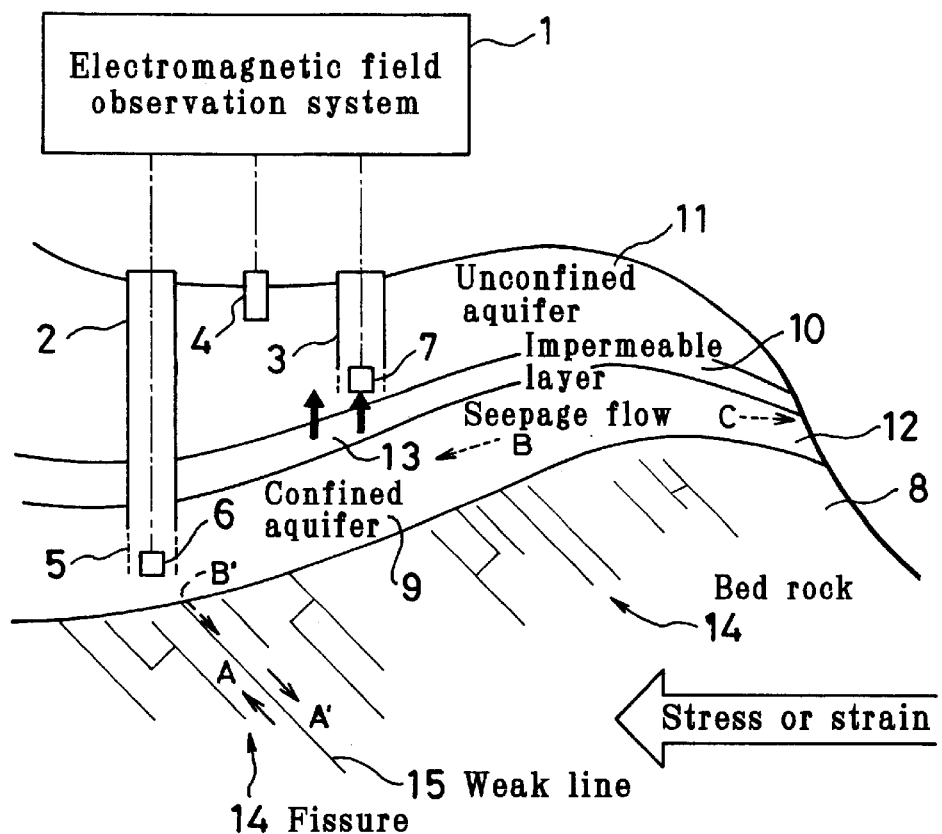
FIG. 1 is a diagram for describing an embodiment of the method and system for predicting rapid motion in the earth's crust on the basis of an electromagnetic field observation according to the present invention.

FIG. 1 is a diagram for describing an embodiment of the method and system for predicting rapid motion in the earth's crust on the basis of an electromagnetic field observation according to the present invention. In the figure: reference numeral 1 denotes an electromagnetic field observation system; 2 and 3 denote drilled holes; 4 denotes a reference electrode; 5 denotes a screen; 6 and 7 denote electromagnetic field sensors; 8 denotes bed rock; 9 denotes a confined aquifer; 10 denotes an impermeable layer; 11 denotes an unconfined aquifer; 12 denotes a spring area; 13 denotes a leakage area; 14 denotes fissures; and 15 denotes a weak line.

In FIG. 1, the bed rock 8 is solid ground. In general, the bed rock 8 has low water permeability and consists essentially of sedimentary rock, igneous rock, metamorphic rock, etc. The confined aquifer 9 is located above the bed rock 8 and made of a medium (permeable layer) in which groundwater is stored and flows. The impermeable layer 10 is solid ground or rock mass covering the upper surface of the confined aquifer 9 and having low water permeability. The unconfined aquifer 11 is an earth's surface layer above the impermeable layer 10. The spring area 12 is where the confined aquifer 9 or the like opens on the earth's surface. The leakage area 13 is a part of the impermeable layer 10 where pore water oozes out from a fractured portion. The term "fissures 14" is used as a general term for voids and cracks produced in solid rock mass during the formation of rocks or by tectonism thereafter. The weak line 15 is one of the fissures 14 that is particularly weak in strength.

There is substantially no difference among earthquakes, volcanic eruptions and ground collapse. Therefore, the relationship between the motion of pore water and an earthquake, by way of example, will be described below. An earthquake results from rapid slip in the direction A–A' along the weak line 15, which is particularly weak in strength among the fissures 14 in the bed rock 8, owing to an increase in stress or strain due to plate motions. As a precursor of an earthquake, groundwater in the confined aquifer 9 enters the fissures 14 in the bed rock 8 through the interface. At this time, a particularly large amount of groundwater enters the weak line 15, thereby making it easy for slip to occur, and an instantaneous slip causes an earthquake to occur. In other words, an instantaneous slip along the weak line 15 leads to an earthquake. The motion of pore water is a seepage flow of groundwater in the confined aquifer 9, which is a flow through a porous medium. The motion of pore water controls rapid motion in the earth's crust, such as an earthquake, a volcanic eruption, a landslide and ground collapse.

The drilled holes 2 and 3 are boreholes used to bury electromagnetic field sensors in previously investigated groundwater veins or the like in the area concerned to measure electromagnetic field variations. In the drilled holes 2 and 3, casing pipes are inserted to place electromagnetic field sensors 6 and 7 of high sensitivity at the respective distal ends of the casing pipes to measure changes in an electric field and/or a magnetic field. For this purpose, each of the casing pipes is an electrically conductive pipe made of steel or the like, and a screen 5 is formed at the distal (lowermost) end of each casing pipe. The screen 5 has a sufficient number of openings to permit recycling groundwater to pass. A length of each casing pipe that extends over ten-odd meters, including a portion in which the electromagnetic field sensor 6 or 7 is placed, is made of a non-magnetic material. Of the drilled holes, the drilled hole 2 is a borehole drilled as far as the inside of the confined aquifer 9. The drilled hole 3 is a borehole drilled as far as a position near the upper surface of the impermeable layer 10 in the vicinity of the leakage area 13. Where there is a leakage area 13 in the impermeable layer 10, the casing pipe need not reach the confined aquifer 9 directly as in the drilled hole 2, but the motion of pore water can be detected by using a borehole drilled as far as a position near the upper surface of the impermeable layer 10 like the drilled hole 3. The reference electrode 4 is an electrode for detecting the electric potential at the earth's surface as a reference potential. The reference electrode 4 constitutes an electric field sensor in combination with two other electrodes that are formed by the casing pipes inserted into the drilled holes 2 and 3. The electric field sensor measures the electric potential at the location of each casing pipe. The electromagnetic field observation system 1 analyzes electromagnetic field changes measured with the electromagnetic field sensors 6 and 7, the reference electrode 4, etc. to sense the motion of ground pore water that plays an important role in causing rapid motion in the earth's crust, such as a volcanic eruption, an earthquake, a landslide and ground collapse.

In general, groundwater contains ions, and when it flows along a fixed wall, an electrokinetic current is produced, and this causes variations in electric and magnetic fields (electrokinetic phenomena). The electromagnetic field variations can be detected by measuring the electric field and/or the magnetic field with the electromagnetic field sensor 6 in the drilled hole 2 bored to reach the confined aquifer 9 and the electromagnetic field sensor 7 in the drilled hole 3 bored as far as a position near the upper surface of the impermeable layer 10. It is also possible to measure the electromagnetic field variations as potential differences between the electrically conductive casing pipes and the reference electrode 4 on the earth's surface. Accordingly, the electromagnetic field variations thus measured are detection information concerning electrokinetic phenomena. The motion of pore water can be sensed on the basis of the information concerning electrokinetic phenomena. Thus, it is possible to sense the motion of ground pore water that can cause an earthquake or a volcanic eruption, which are destructive phenomena in the earth's crust.

Figure 2:
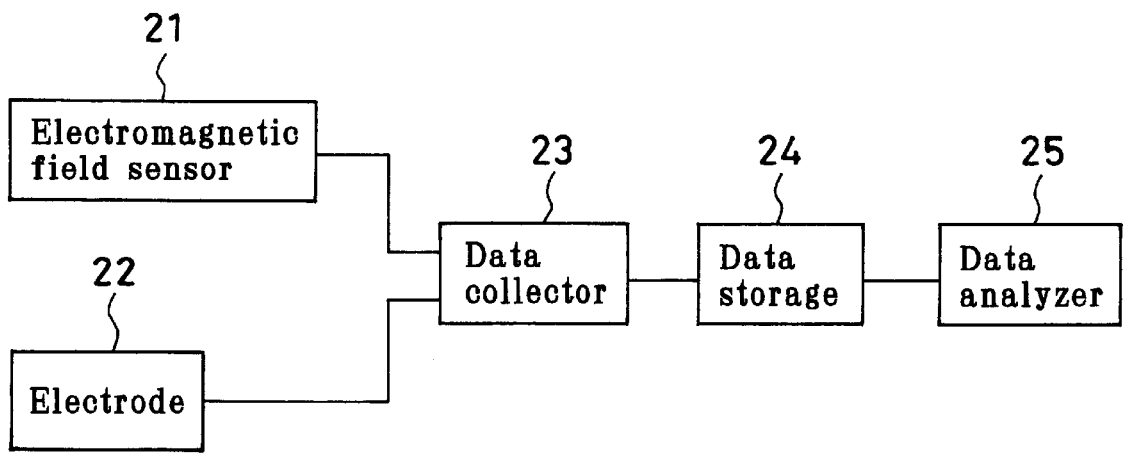
FIG. 2 is a block diagram showing a structural example of an electromagnetic field observation system.
Figure 3:
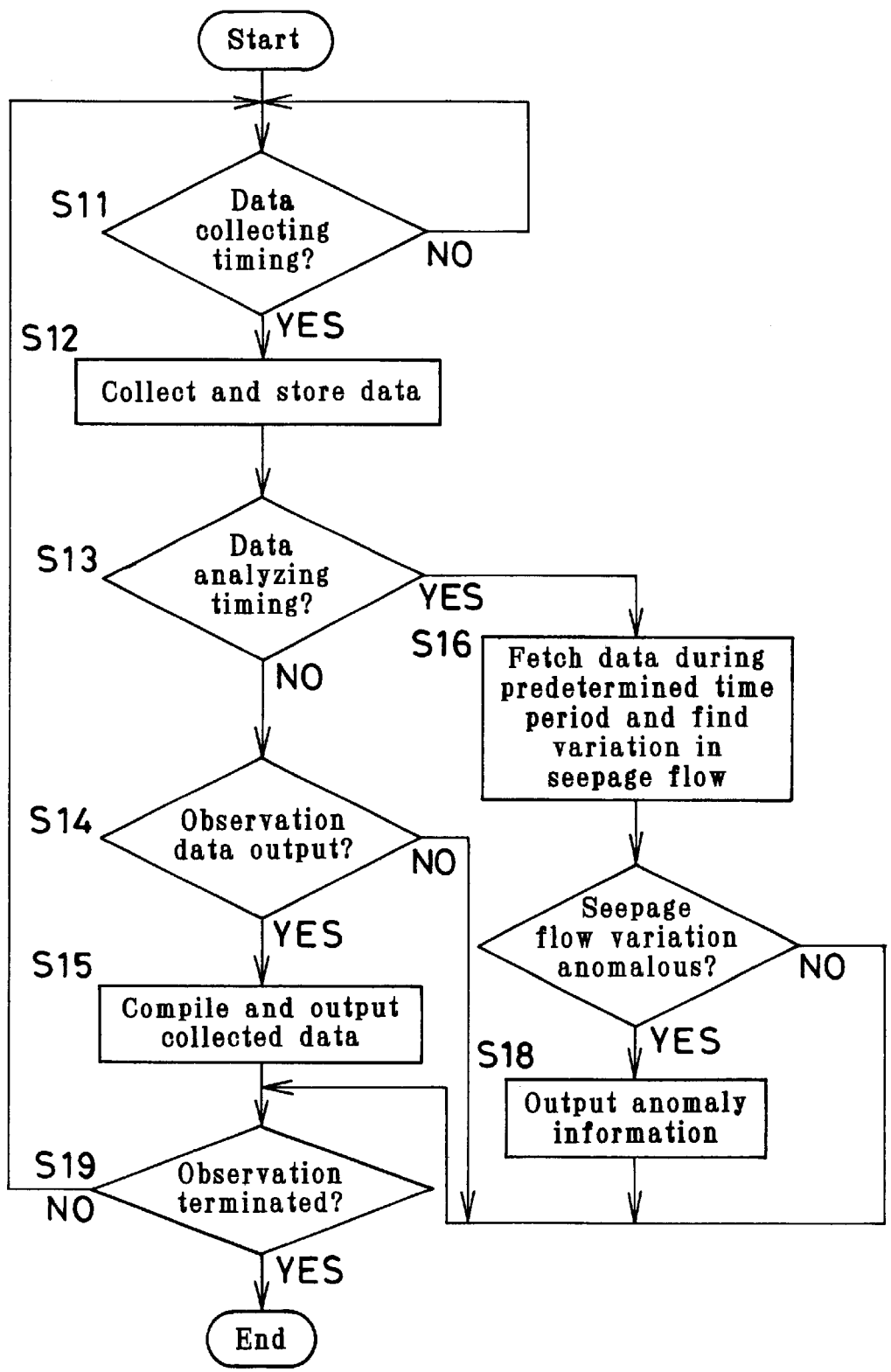
FIG. 3 is a flowchart for describing an example of processing executed by the electromagnetic field observation system.

The following is a description of the arrangement of the electromagnetic field observation system and processing executed by the system. FIG. 2 is a block diagram showing a structural example of the electromagnetic field observation system. FIG. 3 is a flowchart for describing an example of processing executed by the electromagnetic field observation system. As shown in FIG. 2, the electromagnetic field observation system includes an electromagnetic field sensor 21, an electrode 22, a data collector 23, a data storage 24, and a data analyzer 25.

In FIG. 2, the electromagnetic field sensor 21 is placed at the distal end of a casing pipe to measure a magnetic field (i.e. the electromagnetic field sensors 6 and 7 shown in FIG. 1). The electrode 22 is used to measure an electric potential difference between an electrically conductive casing pipe inserted into a drilled hole and the earth's surface (i.e. the reference electrode 4 shown in FIG. 1). The data collector 23 collects data measured with the electromagnetic field sensor 21 and/or the electrode at a predetermined sampling period, for example. The data storage 24 stores the collected data in a storage device. The data analyzer 25 makes an analysis based on the data collected and stored in the data storage 24 to sense the motion of ground pore water and outputs predictive information about an earthquake, a volcanic eruption or the like on the basis of an anomaly judgment on the pore water motion.

The above-described processing by the electromagnetic field observation system is executed as shown in FIG. 3 by way of example. First, at every data collecting timing (step S11), data is collected and stored (step S12). When the data has been collected and stored, a judgment is made as to whether or not it is data analyzing timing (step S13). The data analyzing interval is longer than the data collecting interval. If NO is the answer, it is judged whether or not there is a request to output observation data furthermore (step S14). If YES is the answer, the collected data is outputted after being compiled in a desired format, e.g. a graph or a table (step S15). If YES is the answer in the processing at step S13 (i.e. if it is data analyzing timing), data collected during a predetermined period of time is fetched from the data storage to find a variation in the seepage flow (step S16), and it is judged whether or not the variation in the seepage flow is anomalous (step S17). The variation in the seepage flow is judged to be anomalous when there is an extraordinary increase in the seepage flow, or when there is an extraordinary increase in the rate of increase in the value of seepage flow during a predetermined period of time, or when there is an extraordinary increase in the integrated quantity of seepage flow, or when there is an extraordinary increase in the range of variations in the value of seepage flow. When the variation in the seepage flow is judged to be anomalous, anomaly information is outputted (step S18). The above-described processing is executed repeatedly (step S19).

It should be noted that the present invention is not limited to the foregoing embodiments but can be modified in a variety of ways. For example, although in the foregoing embodiments, an electromagnetic field sensor of high sensitivity is placed directly in an aquifer, a hot spring vein, a high-temperature water vein or vicinities thereof in an area where an earthquake, a volcanic eruption, a landslide or ground collapse may occur to detect the motion of ground pore water, the electromagnetic field sensor and the electrode may be buried in the vicinities of a spring, a hot spring or a water vapor opening on the earth's surface to measure changes in the electromagnetic field because the electromagnetic field of the confined aquifer 9 changes in accordance with the motion of ground pore water.

As will be clear from the foregoing description, according to the present invention, an electromagnetic field is measured in or near a confined aquifer in which groundwater is stored and flows, and the motion of ground pore water is sensed on the basis of the measured electromagnetic field to predict rapid motion in the earth's crust. Therefore, the occurrence of a volcanic eruption, an earthquake, a landslide or ground collapse can be estimated with higher accuracy based on the observation of changes in the motion of ground pore water, which controls rapid motion in the earth's crust, such as an earthquake, a volcanic eruption and ground collapse. In other words, it is possible to sense the flow of ground pore water, which may cause rapid motion in the earth's crust, and to predict the activity of the rapid motion. Hence, it is possible to effectively predict the occurrence of an earthquake, a volcanic eruption, etc. Thus, it is possible to sense a precursory phenomenon and to predict rapid motion in the earth's crust by a simple method and system.

What we claim is:

1. A prediction method of predicting rapid motion in the earth's crust, said method comprising the steps of:

measuring an electromagnetic field in or near a confined acquifer in which groundwater is stored and flows; and sensing motion of ground pore water on a basis of said electromagnetic field to predict rapid motion in the earth crust;

wherein measurement of said electromagnetic field is performed at a distal end of a casing pipe inserted into a drilled hole.

2. A prediction system for predicting rapid motion in an earth's crust, said system comprising:

a casing pipe inserted into a drilled hole reaching an inside of a confined aquifer in which groundwater is stored and flows or a position near said confined aquifer;

measuring means for measuring an electromagnetic field at a distal end of said casing pipe; and analyzing means for analyzing data concerning the electromagnetic field measured by said measuring means to sense motion of ground pore water, thereby predicting rapid motion in the earth's crust.

3. A prediction system according to claim 2, wherein said measuring means includes an electromagnetic field sensor placed in a screen portion.

4. A prediction system according to claim 2, wherein said measuring means includes said casing pipe as an electrode for measuring an electric potential relative to an electric potential at an earth's surface detected with a reference electrode.

* * * * *